United States Patent [19]

Zukowski

[11] 4,284,739

[45] Aug. 18, 1981

[54] BLOCK COPOLYMERIZATION PROCESS

[75] Inventor: Edward A. Zukowski, Clark, N.J.

[73] Assignee: El Paso Polyolefins Company, Paramus, N.J.

[21] Appl. No.: 64,961

[22] Filed: Jul. 27, 1979

[51] Int. Cl.³ .......................................... C08F 255/04
[52] U.S. Cl. .................................. 525/268; 525/270; 525/323
[58] Field of Search ...................... 525/270, 268, 323

[56] References Cited

U.S. PATENT DOCUMENTS

| | | | |
|---|---|---|---|
| 3,442,978 | 5/1969 | Khelghatian et al. | 525/270 |
| 3,514,501 | 5/1970 | Leibson et al. | 525/270 |
| 3,624,184 | 11/1970 | Cox et al. | 525/53 |
| 3,830,787 | 8/1974 | Susa | 260/94.9 |
| 3,953,414 | 4/1976 | Galli et al. | 526/348 |
| 3,960,987 | 6/1976 | Kelley et al. | 525/268 |
| 4,051,313 | 9/1977 | Luciani et al. | 528/496 |
| 4,115,319 | 9/1978 | Scata et al. | 252/429 B |

FOREIGN PATENT DOCUMENTS 1215896 12/1970 United Kingdom ..................... 525/270

*Primary Examiner*—William F. Hamrock
*Attorney, Agent, or Firm*—Fred S. Valles; Margareta LeMaire

[57] ABSTRACT

A process for the preparation of ethylene-propylene block copolymers at high catalyst productivity rates resulting in polymer products having improved impact strength-polymerized ethylene content relationship.

11 Claims, 1 Drawing Figure

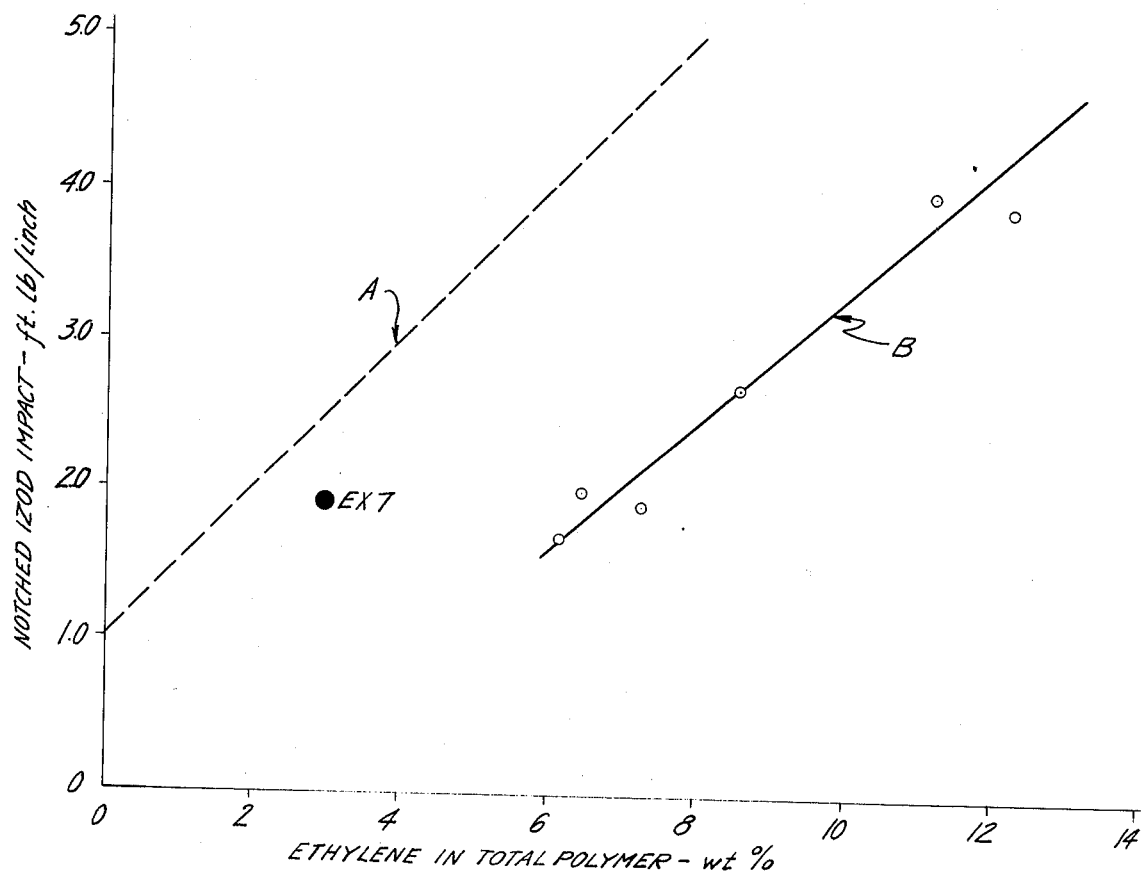

BLOCK COPOLYMERIZATION PROCESS

BACKGROUND OF THE INVENTION

In block polymerization, there is substantially effected a combination of the best physical and chemical properties of two or more polymers, for example, the combination of those of polypropylene with those of polyethylene. Thus, polyethylene, while not possessing melting points or tensile strengths as high as those of propylene, does in fact possess excellent low temperature properties such as brittleness and impact. When the outstanding properties of both of these polymers are combined in the technique of block polymerization, there results at once a heteropolymer useful in many applications for which neither homopolymer was practically useful.

A group of block copolymers, which have excellent physical properties, are the ethylene-propylene block copolymers, e.g. those of the type P-EP, where P denotes a propylene homopolymer preblock and EP is a post-block of ethylene-propylene copolymer. By varying the proportions of the blocks and the polymerized ethylene content, the physical properties can be closely controlled to fit the particular application for which the polymer products are intended. In general, at constant melt flow rates the impact strength at room temperature of the block copolymer is substantially directly proportional to the amount of polymerized ethylene in the total product.

Block copolymers are advantageously produced on a commercial scale by the process disclosed in U.S. Pat. No. 3,514,501. Briefly, this process involves preparation of the preblock, preferably in the liquid phase, by catalytic polymerization of propylene in a hydrocarbon diluent such as liquid propylene to form a slurry. After separation of the slurry, the prepolymer which still contains active catalyst residues is introduced into at least one reaction zone, where it is reacted with monomer vapors for a sufficient period of time to form the polymer post block onto the polymer preblock in the desired proportions.

In the past the conventional catalyst system used in such a polymerization process has been an unmodified or an electron donor-modified titanium halide component, activated with an organo-aluminum cocatalyst. Typical examples of conventional propylene polymerization catalyst systems include cocrystallized titanium trichloride-aluminum trichloride catalysts of the general formula n.TiCl$_3$.AlCl$_3$ activated with diethyl aluminum chloride or triethylaluminum. The cocrystallized titanium trichloride-aluminum trichloride can have been subjected to a modification treatment with a suitable electron donor compound to increase its activity or stereospecificity. Such compounds include phosphorus compounds, esters of inorganic and organic acid ethers and numerous other compounds.

One major drawback, however, in using the aforementioned conventional catalysts, has been the low catalyst productivity, which has necessitated the subsequent deashing of the product to reduce the content of catalyst residues, which otherwise would detrimentally affect the product quality.

Recently new catalysts have been developed which are far more active than the aforementioned conventional catalysts in the polymerization of α-olefins. Briefly described, these catalysts are comprised of a titanium halide catalyst component supported on magnesium dihalide and an alkylaluminum compound, which can be present as a complex with an electron donor compound. These catalyst compounds have been described in the patent literature, e.g. in U.S. Pat. Nos. 3,830,787, U.S. Pat. No. 3,953,414, U.S. Pat. No. 4,051,313, U.S. Pat. No. 4,115,319.

The productivities obtained with these new catalyst are extremely high resulting in polymers containing such small quantities of residual catalyst that the conventional deashing step can be dispensed with. The catalysts function well in the homopolymerization of propylene and in the copolymerization of a mixture of propylene and another α-olefin such as ethylene, provided that the polymerization reaction is carried out in a liquid diluent, e.g. liquid propylene monomer. However, in the vapor phase polymerization used in preparing the EP copolymer block of the P-EP block copolymer described above, using conventional operating conditions, it has been found that the product quality of the resulting block polymer has been substantially inferior. Specifically, in order to achieve a desired impact strength at a desired melt flow, it was found that considerably more ethylene had to be incorporated into the total polymer than is the case when employing conventional catalyst. The necessary increase in ethylene content to achieve the impact strength detrimentally affects other desirable properties of the final product such as stiffness, heat deflection temperature, tensile properties, etc.

It is therefore an object of the present invention to provide a highly efficient process for the vapor phase polymerization of ethylene-propylene blocks onto a preformed propylene polymer yielding polymer products having improved impact strength without significantly affecting other desirable physical polymer properties.

Another object of the invention is to provide a process for the preparation of ethylene-propylene block copolymers wherein the polymerized ethylene content of the total polymer product is minimized to achieve a desired impact strength.

Further objects will become apparent from a reading of the specification and claims.

THE INVENTION

The above objects are accomplished by a continuous sequential vapor phase block copolymerization process which comprises:

(A) providing a preformed propylene polymer in finely divided form, said preform polymer containing active catalyst residues and having been prepared by polymerizing propylene in the presence of a catalyst composition containing the components
 (a) an aluminum trialkyl or an aluminum trialkyl at least partially complexed with an electron donor compound, and
 (b) titanium tri- or tetrahalide supported on magnesium dihalide, or a complex of a titanium tri- or tetrahalide with an electron donor compound supported on magnesium dihalide;

(B) introducing said preformed polymer into at least one continuously agitated reaction zone, (C) introducing ethylene and propylene monomers to said reaction zone in a molar ratio of ethylene to propylene of from about 0.15 to about 0.3, (D) polymerizing said ethylene and propylene monomers in the vapor phase in the reaction zone onto said preformed propylene prepolymer.

As used throughout this specification and the claims of this invention, the following terms are intended to have the following meanings: (a) "preformed polymer" means a propylene polymer which is suitable for independent use, but which contains active catalyst residues; (b) "active catalyst residues" as used herein indicates catalytic components in the polymer which function to polymerize added monomeric substances without the need of adding further quantities of catalyst. The active residues referred to herein are preferably those initially employed in the polymerization to produce the preformed polymer; (c) a "block polymer" has the same significance as heretofore understood in the prior art, that is, a polymer molecule consisting of a single section of an alpha-olefin polymer or copolymer attached to a single section of another alpha-olefin polymer or copolymer. Block polymers are intended to include two or more copolymers sequentially polymerized one onto the other; a homopolymer followed by a copolymer; or alternating homo or copolymer blocks of two or more alpha-olefin monomers; (d) "volatile constituents" include unpolymerized alpha-olefin monomers, as well as inert hydrocarbon diluents such as ethane, propane, butane, pentane, hexane, heptane, octane, aromatic hydrocarbons, diesel oils and the like; (e) by polymerization in a "hydrocarbon diluent", it is intended that polymerization can occur in the presence of inert hydrocarbon diluents such as those named above in (d) or polymerizations wherein the monomer, i.e. propylene, under conditions of temperatures and pressure is kept in liquid form during the polymerization, thereby serving as its own dispersing medium or mixture of inert hydrocarbons and olefin monomers in liquid form; (f) by "vapor phase" block polymerization and "substantially dry prepolymer" it is intended to mean that a preformed polymer contains in the order of 5% or less of volatile constituents, is reacted with gaseous monomers in the absence of added inert hydrocarbon diluents.

Propylene, optionally in admixture with minor amounts of other α-olefins of from about 2 to 10 carbon atoms or more can be employed to form a prepolymer. Such other α-olefins include ethylene, butene-1, isobutene-1, pentene-1, hexene-1 and higher, as well as branched alpha-olefins such as 2-methyl butene-1, 4-methyl pentene-1 and higher. Of these monomers, propylene and mixtures of propylene and ethylene are of special interest and most preferred. When ethylene is a component, it is preferred that it be limited to a concentration of from about 0.3 to about 2 wt % of the total monomer feed.

The prepolymer is formed in a reaction zone employing a hydrocarbon diluent and a catalyst for the polymerization, carrying out the polymerization to a solids content of from 5 to 60%, but preferably 20 to 40%. The preferred diluent is liquid propylene.

In the preferred process for the prepolymer formation, i.e. the well known "liquid pool" process, the propylene functions as the liquid diluent as well as feed to the reaction, except for small quantities of inert hydrocarbons, e.g. hexane, mineral oil, petrolatum, etc., that may be used for the introduction of the catalyst components into the reaction zone.

The reaction is continuous and monomer feed and catalyst components are continuously fed to the reactor and a slurry of polymer product and liquid propylene is withdrawn, preferably through a cyclic discharge valve which simulates continuous operation. Various modifiers such as hydrogen may be added to alter the properties of the polymer product. Such modifiers are well known in the art and need not be discussed in any further detail since they form no part of this invention.

The catalyst components used in the process for preparing the prepolymer can be any one of the recently developed, high activity magnesium halide supported catalyst components and organoaluminum cocatalyst components disclosed e.g. in U.S. Pat. No. 3,830,787, U.S. Pat. No. 3,953,414, U.S. Pat. No. 4,051,313, U.S. Pat. No. 4,115,319, hereby incorporated in this application by reference.

Typically, such a catalyst composition is a two component composition where the components are introduced separately into the polymerization reactor. Component (a) of such a composition is advantageously selected from trialkyl aluminums containing from 1 to 8 carbon atoms in the alkyl group, such as triethyl aluminum, trimethyl aluminum, tri-n-butyl aluminum, triisobutyl aluminum, triisohexyl aluminum, tri-n-octyl aluminum and triisooctyl aluminum. Most preferably the trialkyl aluminum is complexed with an electron donor prior to introduction into the polymerization reactor. Best results are achieved when esters of carboxylic acids or diamines, particularly esters of aromatic acids are used as the electron donors.

Some typical examples of such compounds are methyl- and ethylbenzoate, methyl- and ethyl-p-methoxybenzonate, diethylcarbonate, ethylacetate, dimethylmaleate, triethylborate, ethyl-o-chlorobenzoate, ethylnaphthenate, methyl-p-toluate, ethyltoluate, ethyl-p-butoxy-benzoate, ethyl-cyclohexanoate, ethylpivalate, N,N,N',N'-tetramethylenediamine, 1,2,4,-trimethylpiperazine, 2,5-dimethylpiperazine and the like. The molar ratio of aluminum alkyl to electron donor can range between 1 and 100, preferably between 2 and 5. Solutions of the electron donor and the trialkyl aluminum compound in a hydrocarbon such as hexane or heptane are preferably prereacted for a certain period of time generally less than 1 hour to feeding the mixture into the polymerization reaction zone.

The other component of the catalyst composition is either a titanium tri- or tetrahalide supported on magnesium dihalide, or a complex of a titanium tri- or tetrahalide with an electron donor compound supported on magnesium dihalide. The halogen in the respective halides can be chlorine, bromine or iodine, the preferred halogen being chlorine. The electron donor, if it is used in forming a complex, is suitably selected from the esters of inorganic and organic oxygenated acids and the polyamines. Examples of such compounds are the esters of aromatic carboxylic acids, such as benzoic acid, p-methoxybenzoic acid and p-toluic acids and particularly the alkyl esters of said acids; the alkylene diamines, e.g. N', N'', N''', N''''-tetramethylethylene-diamine. The magnesium to electron donor molar ratio are equal to or higher than 1 preferably between 2 and 10. Generally the titanium content expressed as titanium metal ranges between 0.1 and 20 wt % in the supported catalyst component and preferably between 1 and 3 wt %.

The preparation of such supported catalyst components has been described in the prior art and are commercially available.

The catalyst components (a) and (b) are fed to the prepolymer reaction zone in amounts such that the Al/Ti molar ratio is maintained in the broad range between about 1 and about 10,000 and preferably between about 10 and 200.

Temperatures at which the prepolymer formation can be carried out are those known in the art, for example, from 50° to 250° F., preferably from 115° to 165° F. and most preferably from 125° F. to about 155° F. The pressures in the prepolymer formation can range from atmospheric or below where normally liquid inert hydrocarbon diluents are used (heptane or hexane) to pressures up to 500 psig or higher where propylene is used as its own dispersing agent or the propylene in admixture with a normally gaseous hydrocarbon diluent such as propane or butane, which are liquid under the conditions of the reaction.

The prepolymer from the reaction zone is taken to a separation zone, such as a cyclone or a bag filter, wherein the volatile constituents are separated from the polymer and processed according to known techniques and recycled to the reaction zone, the amount of volatiles removed being sufficient so that less than 10% and preferably no more than 5% volatile content remains in the prepolymer.

In the vapor phase block polymerization, the polymer recovered from the separation zone and containing active catalyst residues, is taken to a continuously agitated reaction zone containing provisions therein for introducing the ethylene monomer and propylene monomer at one or more points along the length of the zone (and inert gases such as nitrogen) so that the active catalyst residues in the prepolymer polymerize said monomers to a block thereby modifying the ultimate properties of the resin produced. The polymerization in the continuously agitated reaction zone is generally carried out at pressures lower than those used for the prepolymer preparation, i.e. pressures of 10 to 50 psig or somewhat higher. Polymerization temperatures can range, for example, from about 50° F. to about 210° F., but preferably from about 130° to about 200° F.

The ethylene and propylene monomers do not require premixing prior to introduction into the vapor phase zone; in fact, it is more advantageous to separately introduce each of the monomers at one or preferably several points along the reactor length. Liquid propylene can be introduced, which upon vaporization will remove some of the heat of polymerization generated in the reaction zone. The molar ratio of the total ethylene to total propylene introduced to the reaction zone should, however, be restricted within the range of from about 0.15 to about 0.3. If higher ratios are employed, it has been found that the effectiveness of the ethylene content in the total polymer product on the impact properties is severely decreased. For instance, at a ratio of 0.5 it is required to incorporate about twice the amount of ethylene into the total polymer in order to obtain the same impact strength as that of a final product prepared at a ratio of about 0.2.

Generally from about 5 to about 40 percent by weight of block based on the weight of the total polymer is produced in the total block polymerization reactor system.

Suitable continuously agitated reaction zones include those disclosed in U.S. Pat. No. 3,514,501, incorporated into this application by reference. The reaction zone can be one or more pipe line reactors in series with optional jacketing for heat removal and suitable monomer introduction points as well as agitating means. According to the preferred embodiment of this invention, one or more horizontal ribbon blender reactors are provided for the continuous operation. Such reactors are equipped internally with a series of ribbon blades and/or paddles rotated by a power drive. By suitable arrangement of the agitation equipment the polymer can be moved continuously from the inlet to the outlet. The polymer powder substantially independent of any agitation, behaves much like a fluid and "flows" or moves from the inlet end of the reactor to the outlet end, that is, flows along the length of the reactor in much the same manner as a fluid like a liquid would.

Propylene is provided at least to the inlet of the reactor and if liquid propylene monomer is used, it is preferably also provided through inlet spray nozzles spaced along the upper portion of the reactor. Ethylene monomer feed in vapor form can be introduced in similar fashion at points along the length of the reactor. The reactor is advantageously provided with an external cooling jacket for removal of heat through the reactor wall. If desired, additional vapor-phase reactors can be provided in series with the block polymerization reactor for the purpose of increasing residence time.

To modify the melt behavior of the polymers prepared according to the process of this invention, hydrogen in amounts of 1 to 25 mole percent is often used in the prepolymer preparation. Other known chain regulators can be used instead of hydrogen.

The final product polymer does not require any deashing after separation from the unreacted monomers, which are suitably recycled to the vapor phase reaction zone. End use applications for the polymer products include injection molding of housewares and containers, blow molding of bottles, extrusion of packaging films, etc.

The following examples illustrate the advantages obtained by the invention.

EXAMPLES

The experiments were conducted in large scale continuous pilot plant operations. For the prepolymer preparation propylene and catalyst components were continuously charged to a stirred reactor, the monomer feed rate corresponding to 2 hours residence time in the reactor. The organoaluminum compound of the catalyst system was a hexane solution of triisobutyl aluminum (TIBA) which had been treated prior to introduction into the reactor with a hexane solution of methyl-p-toluate (MPT), an electron donor compound. The solid supported titanium halide catalyst component was a commercially available catalyst (FT-1) obtained from Montedison, S.p.A., Milan, Italy. The supported catalyst component contained about 1.5 wt % titanium, 20.3 wt % magnesium, 60.0 wt % chlorine and 9.6 wt % hydrocarbon volatiles. Ethylbenzoate had been used in the manufacture of the supported catalyst component. The two catalyst components were added at rates directly proportional to the polymer production rates and in amounts sufficient to maintain a polymer solids concentration in the reactor slurry at a nominal value of about 40%. The catalyst productivity (lb polymer/lb of Ti metal) was calculated in each case from the polymer slurry withdrawal rate, solids content in the slurry and the titanium catalyst component addition rate.

After separation of the prepolymer from unreacted propylene, said prepolymer which still contained active catalyst residues was fed sequentially to two serially connected, water-cooled jacketed horizontal reactors, each provided with ribbon blades as agitation means.

Propylene was introduced near the inlet of each of the reactors and ethylene monomer through three inlets spaced evenly across each of the reactors. The block copolymer product was recovered from the outlet of the second reactor. The operating conditions in each of the reactors were essentially the same unless otherwise noted. Pertinent operating conditions and results are shown in Table 1. In the Figure, the relationship of wt % ethylene in the product is plotted against the notched Izod impact strength (at room temperature). Curve A denotes the typical relationship obtained when preparing the prepolymer with conventional catalyst, e.g. Stauffer AA catalyst (3TiCl$_3$.AlCl$_3$) with diethyl aluminum chloride as cocatalyst (at Al/Ti molar ratio of about 3) and under conditions to produce a final product melt flow of about 2 grams/10 mins. It has been found that in such a conventional process the ethylene/propylene molar ratios used in the vapor phase reaction zone may be varied considerably, e.g. from about 0.2–0.8, without having any material effect on the relationship shown by curve A.

Curve B depicts the ethylene content Izod impact strength relationships obtained in Comparative Examples 1–6.

TABLE 1

| EX. NO. | COMP. 1 | COMP. 2 | COMP. 3 | COMP. 4 | COMP. 5 | COMP. 6 | EX. 7 |
| --- | --- | --- | --- | --- | --- | --- | --- |
| Prepolymer Prod. | | | | | | | |
| Temp. - °F. | 130 | 130 | 155 | 130 | 130 | 130 | 130 |
| Pressure - psi | 340 | 340 | 440 | 340 | 340 | 340 | 340 |
| Al/Ti - mol/mol | 75 | 150 | 75 | 150 | 150 | 150 | 150 |
| Tiba/MPT - mol/mol | 3.5 | 2.8 | 3.5 | 2.8 | 3.5 | 3.5 | 2.8 |
| Res. time - hrs. | ← | ← | ← | 2 hours | → | → | → |
| Productivity - 1000 lbs/lb Ti | 226 | 305 | 271 | 280 | 270 | 270 | 333 |
| Vapor phase block polym. | | | | | | | |
| Temp. - °F. | 180 | 200 | 200 | 200 | 180 | 200/180 | 200 |
| Pressure - psig | 40 | 40 | 40 | 40 | 40 | 40 | 40 |
| Ethylene/Propylene | 0.54 | 0.5/0.2 | 0.54 | 0.4 | 0.54 | 0.2/0.54 | 0.2 |
| Block copolymer product | | | | | | | |
| Ethylene content - wt % | 6.2 | 6.5 | 7.3 | 8.6 | 11.2 | 12.3 | 3.0 |
| Block - wt % | 11 | 18 | 15 | 15 | 31 | 15 | 20 |
| Melt flow - g/10 min | 2.0 | 2.2 | 2.5 | 2.1 | 1.6 | 2.3 | 2.0 |
| Notched Izod - ft. lb/in. | 1.7 | 2.0 | 1.9 | 2.7 | 4.0 | 3.9 | 1.9 |

The polymers of these examples were all prepared with a catalyst of the composition required in this invention, however the vapor phase block copolymerization reactions were each carried out at ethylene/propylene ratios outside the limits of this invention. As seen from Curve B of the graph, the ethylene incorporated in each of the block copolymers was not very efficient in achieving impact resistance; in fact, about double the ethylene incorporation is needed to obtain products of a desired impact as compared to conventionally prepared block copolymers (Curve A).

Example 7, however, which was prepared according to the present invention, resulted in a block copolymer having a much improved ethylene content-impact resistance relationship (point is indicated in the FIGURE).

It is obvious to those skilled in the art that many variations and modifications can be made to the process of this invention. All such departures from the foregoing specification are considered within the scope of this invention as defined by the specification and the appended claims.

What is claimed is:

1. A continuous sequential vapor phase block copolymerization process for the production of impact resistant ethylene-propylene polymers at high productivity rates, which comprises:

(A) providing a preformed propylene polymer in finely divided form, said preformed polymer containing active catalyst residues and having been prepared by polymerizing propylene in the presence of a catalyst composition containing the components
  (a) an aluminum trialkyl at least partially complexed with an aromatic acid ester electron donor compound wherein the aluminum trialkyl is one containing from 1 to 8 carbon atoms in the alkyl groups and the molar ratio of trialkyl aluminum to electron donor ranges between 2 and about 5, and
  (b) a complex of a titanium tri- or tetrahalide with an aromatic acid ester electron donor compound supported on magnesium dihalide wherein the titanium content of component (b) is about 1 and about 3 weight percent,
wherein catalyst components (a) and (b) are provided to the reaction zone in a molar ratio of Al/Ti of between about 10 and about 200;

(B) introducing said preformed polymer into at least one continuously agitated reaction zone;

(C) introducing ethylene and propylene monomers to said reaction zone in a molar ratio of ethylene to propylene of from about 0.15 to about 0.3;

(D) polymerizing said ethylene and propylene monomers in the vapor phase in the reaction zone onto said preformed propylene prepolymer at a temperature of from about 50° F. to about 210° F.

2. A process according to claim 1, wherein the preformed propylene polymer is produced in a polymerization zone under sufficient pressure to maintain propylene in liquid phase.

3. A process according to claim 1, wherein the preformed propylene polymer is propylene homopolymer.

4. A process according to claim 1, wherein the electron donor ester of component (a) is methyl-p-toluate.

5. The process of claim 1, wherein component (a) is prepared by prereacting the aluminum trialkyl with the electron donor for less than one hour prior to polymerization.

6. The process of claim 1, wherein the titanium tri- or tetrahalide is a titanium trichloride or titanium tetrachloride.

7. The process of claim 1, wherein the magnesium dihalide is magnesium dichloride.

8. The process of claim 1, wherein the electron donor ester of component (b) is ethylbenzoate.

9. The process of claim 1, wherein the magnesium to electron donor molar ratio of component (b) is at least about 1.

10. The process of claim 9, wherein said molar ratio is between about 2 and about 10.

11. A process according to claim 1, wherein said temperature of step D is between about 130° to about 200° F.

* * * * *